3,108,523
APPARATUS FOR FITTING CONTACT LENSES
Benjamin Nuchman, 820 Birchwood Drive, Westbury, N.Y., and Sang Y. Whang, 1629 Brooklyn Ave., Brooklyn 10, N.Y.
Filed Sept. 10, 1959, Ser. No. 839,176
4 Claims. (Cl. 95—11)

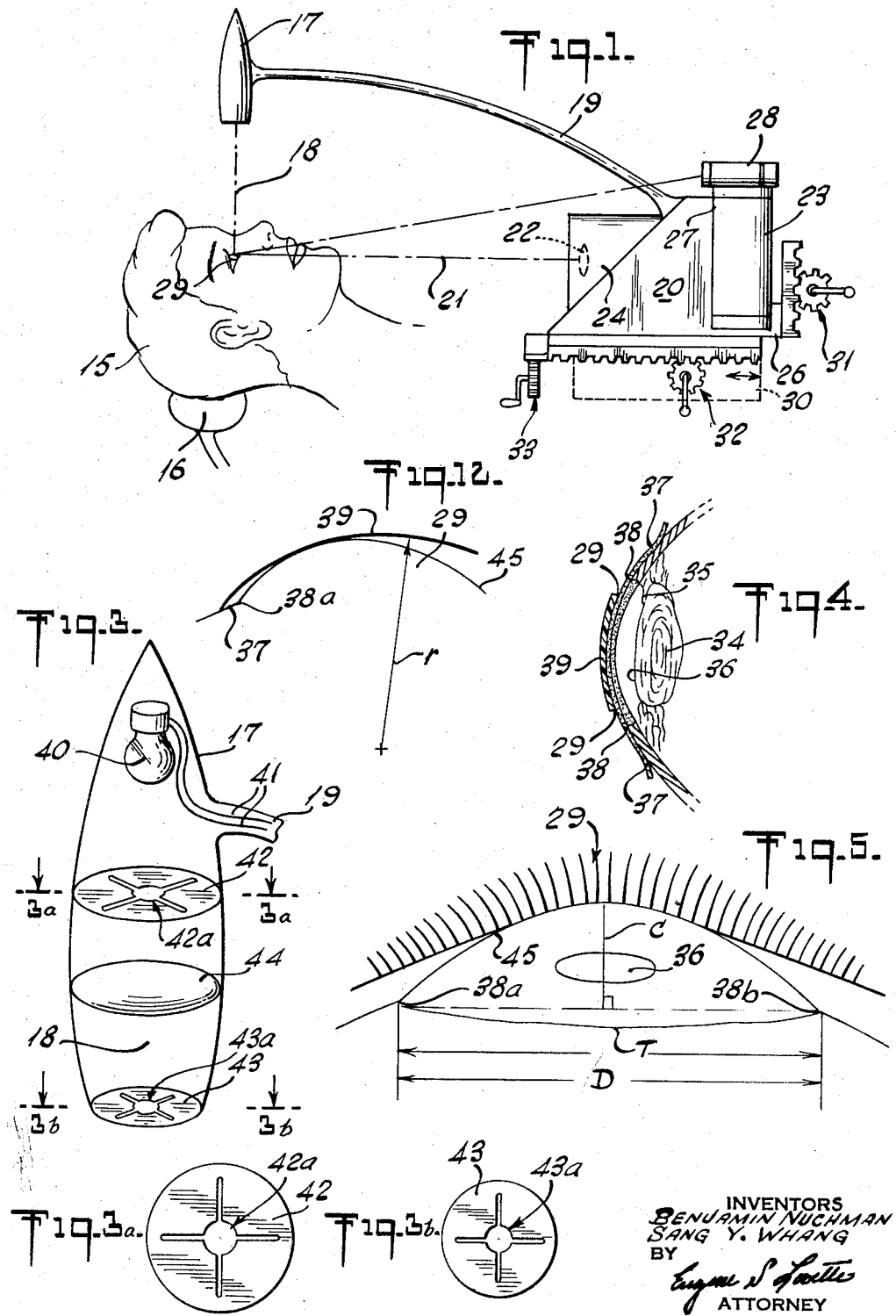

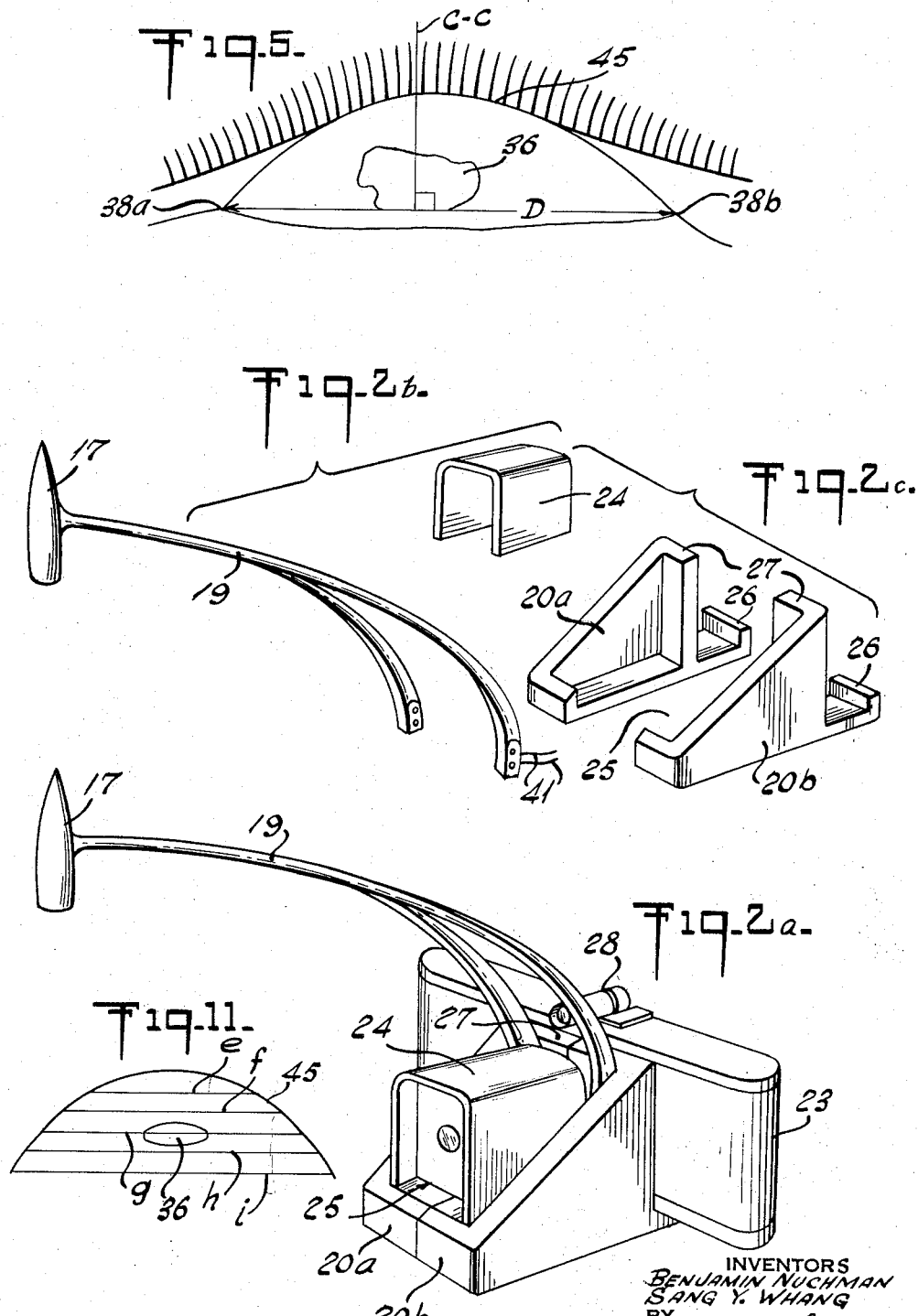

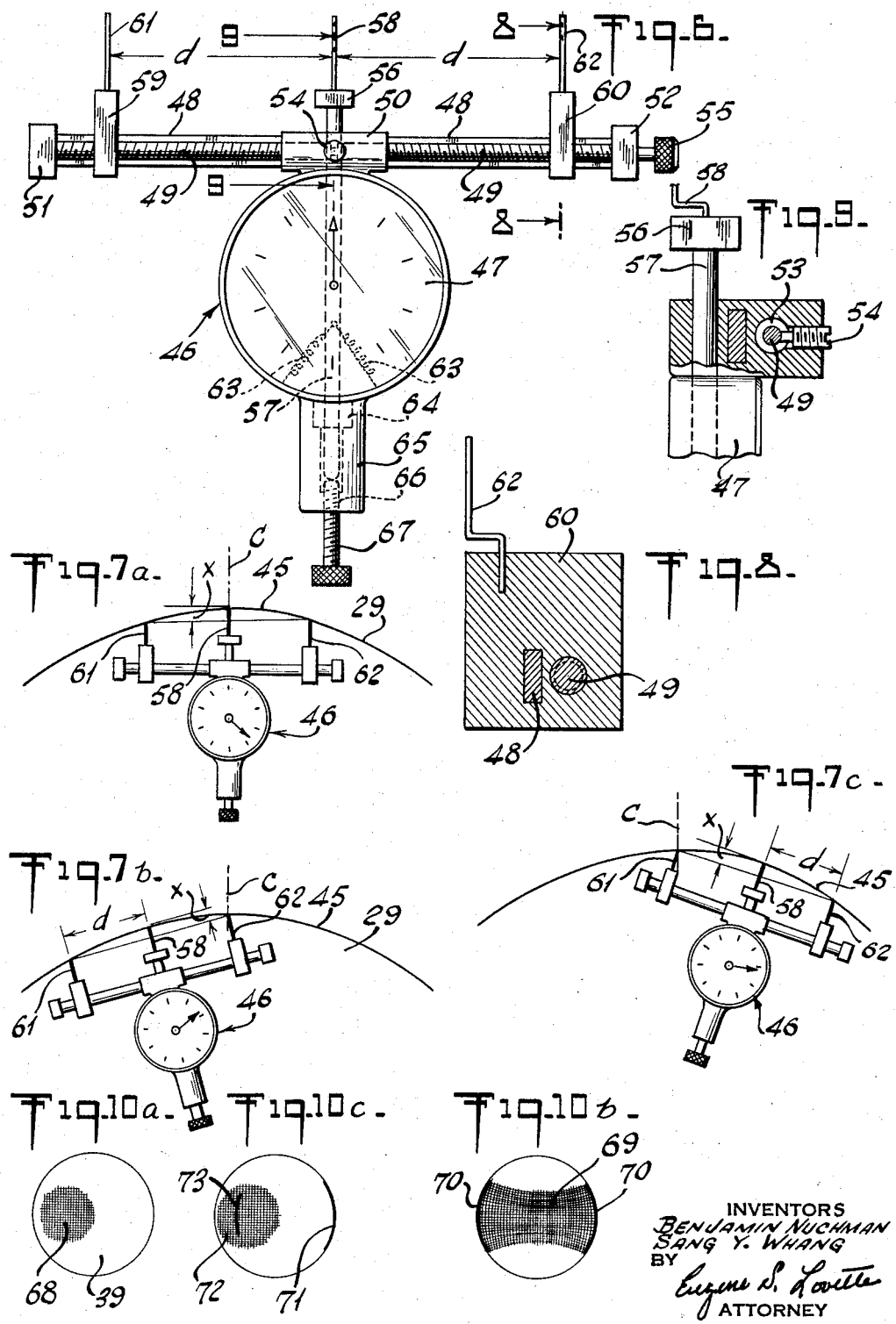

This invention relates to apparatus for improving the techniques of fitting corneal contact lenses to the wearer's eye.

Contact lenses are basically concave-convex in section wherein its posterior concave surface is suitably dimensioned to be mounted and worn directly against the wearer's eyes. A corneal contact lens stays on a human eye by the force of attraction developed by the surface tension of tear fluid and by the adhesion between tear fluid and the lens molecules. This force is directly proportional to the circumference of the lens and normally ranges from 0.15 gram to 0.20 gram. In other words, the lens is pushing the cornea with 0.15 gram to 0.20 gram of force. In accordance with the practice of the improvements herein, the preferred corneal lens is a segment of a sphere, i.e., its posterior concave surface has a single radius of curvature which is designed to contact the cornea so that lens pushing force is distributed over as much of the lens surface area as possible, whereby the pressure (the force per unit area) against the cornea becomes very small with the result that the lens is worn comfortably. On the other hand, when lens curvature is such that the pushing pressure is concentrated or localized at a single point or along a line or multiple of spaced points or lines on the cornea or limbus of the eye, it irritates cornea and/or limbus and causes intolerable pain. If the lens curvature is excessive, i.e., too flat, the lens is subject to rocking or shows peripheral stick-out which causes lid irritations. At flat lens is also subject to popping out of an eye. If the lens is too steep, a radius not large enough for the cornea, the force is generally concentrated at the peripheral edge of the lens. In either situation, discomfort results.

The task of the contact lens fitter in accordance with the instant improvements is to select the size and the radius of curvature of the concave surface of the lens so that the pushing force is distributed evenly over as much area as possible. In accordance with the instant invention, the corneal contact lens is designed so that it never stays at one position on the eye, but continually and freely moves around on the eye because of eye movement, blinking of the eyelid, and the gravitational force. The fact that the lens moves about is very healthy for the lens wearer because it allows the circulation of lacrimal fluids which supplies oxygen to the anterior surface of the cornea. However, since the lens moves around, it is extremely difficult for the fitter to fit a lens unless he has accurate information of the entire anterior surface of the cornea. Unfortunately, there is no known instrument which gives accurate information of the entire surface of cornea. Pursuant to current practices, measurements of radius of curvature of a patient's eye is made by the opthalmometer or keratometer. The information provided by these instruments is the radius of curvature of the apical zone of the cornea. This area encompasses the cornea central zone and is approximately 3 to 4 mm. in diameter and represents only 5 to 10 percent of the area of the entire cornea surface. The information provided by these instruments is essentially an absolute difference in curvature between a high point and a low point within the cornea central zone. In the optical art, such measurements are often referred to the K reading or K measurement.

If the cornea were a perfect sphere, a K reading would be sufficient. However, the cornea is not spherical but more like an elliptic paraboloid. There is no single radius of curvature on an elliptic paraboloid nor on the human cornea. The fitter naturally must supplement the limited K information with knowledge deduced from an examination of the eye structure of the particular patient. The methods and techniques heretofore practiced in fitting corneal contact lenses involves trial and error, because the K measurement does not provide an overall area picture of the changing radii of curvature for the entire cornea. Of greater significance, is the fact that the optical art heretofore did not appreciate that the particular curvature of the cornea for determining the proper curvature of the lens should be the flattest of an average curvature of the cornea and not the curvature of the cornea central zone. For the human eye, the flattest portion of the cornea lies along a horizontal meridian passing through the center of the cornea. For almost all human eyes, this critical cornea curvature lies outside the cornea central zone and adjacent the periphery of the cornea, whereby the flattest curvature of the cornea used herein to determine lens radius is that portion of the cornea profile spanned by a chord extending from the cornea central zone and towards its peripheral edge.

In accordance with the improvements herein, fitting on K or basing the curvature of the lens on the central zone of the cornea as practiced heretofore is not a satisfactory method of fitting a corneal contact lens. Lacking such information and, in particular, not appreciating that the aforesaid flat portion of the cornea, i.e., the horizontal meridian passing through the center of the cornea, should determine the lens curvature, the fitter heretofore provided the patient with a lens causing concentrated pressures along lines or multiples of space points on the eye or which did not comfortably accommodate curvature of the eye upon normal shifting of the lens from one to another of its positions on the eye. Usually the fitter attempted to overcome this problem by resorting to successive fittings of lenses of various sizes and curvatures. For example, using the K measurement as the base, the fitter would try a different size lens of increased radius of curvature until he arrived at a lens which caused the patient the least amount of discomfort and irritation. Except for an extreme or unusual situation, the fitter upon selecting a lens curvature would not exceed the K measurement by .5 mm. and substantially never exceed the K measurement by .8 mm. Heretofore, it has been believed that a lens curvature exceeding the K measurement by .5 mm. or in a most unusual case, a lens curvature exceeding such measurement by .8 mm. would result in a lens too flat for the cornea and thus would cause severe eye irritation and pain if worn for any appreciable length of time. The foregoing described technique of arriving at a satisfactory lens involves a great deal of time, skill, experience and patience both on the part of the fitter and the patient. Oftentimes, it proves too burdensome and discouraging to the patient, and in spite of the discomfort he must experience during this period of trial and error fitting, which may span a period as much as 2 or 3 months, the selected lens in accordance with the current state of the art does not completely eliminate eye discomforts.

Contrary to the practice of the current state of the art, the instant invention contemplates selecting a lens radius of curvature conforming to the radius of curvature of a meridian passing through the center of the cornea, which meridian is characterized by the flattest radius of curvature of all the meridians passing through the eye. The meridian so characterized is the horizontal meridian extending through the center of the cornea and the radius of curvature of the flattest portion of this curve is the portion thereof adjacent its periphery. And, contrary to the fitting techniques heretofore observed, it is this radius of curvature which is used for the lens even though the radius is in the order of 1.0 to 2.0 mm. or more than the K measurement.

The instant invention also contemplates apparatus and methods of fitting corneal contact lenses to overcome the limitations of the current state of the art, by taking a photograph of the patient's eye. The photograph is adapted to give a profile curve of the horizontal meridian extending through the center of the cornea and for the full cornea diameter. The mere idea of taking a photograph of the eye to fit a lens thereto is known, but none of the devices or methods heretofore proposed provide photographs characterized by a uniform and fixed magnification for each picture taken. They employ a fixed focal length camera, but as anybody skilled in the art knows, one can always obtain two well focused pictures of the same object yet in different sizes even with a fixed focal length camera because no consideration heretofore has been given to the depth of focus of the camera. This latter aspect is important because in fitting contact lenses, a one percent error is considered to be intolerable. Furthermore, the picture taken in accordance with the improvements herein will assure the fitter that the photograph will show the flattest meridian curve extending through the center of the cornea for accurate measurement purposes. One cannot properly fit a contact lens with a wrong meridian curve. Consequently, the instant invention also contemplates the measurement of the flattest portion of the horizontal meridian passing through the center of the cornea and using the results of this measurement for determining the posterior curvature of the lens to be applied to the eye.

It is the principal object of this invention to provide a corneal contact lens adapted to be applied to the human eye and also improved methods and apparatus for improving the techniques of fitting such lenses to the human eye.

It is a further object of the instant invention to provide a corneal contact lens adapted to be applied to the human eye and which lens is characterized by a concave posterior surface defined by a segment of a sphere, whereby the lens concave surface has a radius of curvature determined by the curvature of the flattest portion of the cornea; and for a human eye the aforesaid curvature lies along a horizontal meridian passing through the center of the eye.

It is a further object of the instant invention to provide improved means including method and apparatus for measuring the human eye to determine the radius of curvature of the horizontal meridian for the full diameter of the cornea and passing through the center of the eye.

In furtherance of the preceding objects, it is a further object of the invention to provide means including method and apparatus for taking a picture of the aforesaid horizontal meridian, which picture is characterized by a fixed magnification factor in comparison to the size of the eye, and also including method and apparatus for measuring the portion of the aforesaid meridian characterized by the flattest radius of curvature.

It is a further object of the instant invention to provide means including method and apparatus for accurately and efficiently fitting a corneal contact lens to an eye which, in essence, requires one fitting by the optometrist and eliminates the practice of trial and error techniques of the current state of the art.

It is a further object of the invention to provide means including method and apparatus for accurately and efficiently determining a proper diametrical size for a corneal contact lens to be worn on an eye.

Further objects and advantages will become apparent from the following description of the invention taken in conjunction with the figures, in which:

FIG. 1 is a side elevation showing a camera assembly with respect to a patient for taking a picture of an eye in accordance with the present invention;

FIGS. 2a through 2c are perspective views of the aforesaid camera and associate parts in assembled relationship and in exploded disassembled relationship;

FIGS. 3a and 3b illustrate the sight guiding head and components thereof of the aforesaid equipment;

FIG. 4 is a longitudinal sectional view through a human eye;

FIG. 5 depicts a photograph of an eye taken by the apparatus illustrated in FIG. 1;

FIG. 5a depicts a photograph of an irregular human eye taken by the aforesaid apparatus;

FIG. 6 is a top plan view of a curve meter in accordance with the instant invention;

FIGS. 7a, 7b and 7c depict the use of the curve meter on a photograph or projection of such photograph for measuring the curvature of the cornea profile curve taken by the apparatus;

FIG. 8 is a section along line 8 of FIG. 6;

FIG. 9 is a fragmentary view partly in section along line 9 of FIG. 6;

FIG. 10 depicts the pattern of pressure distribution on the cornea for a lens in accordance with the invention;

FIG. 10b illustrates the pattern of pressure distribution on a cornea for a lens in accordance with the prior art;

FIG. 10c is another pressure distribution pattern;

FIG. 11 illustrates a photograph of a substantially spherical eye; and

FIG. 12 depicts the relationship of a lens in accordance with the invention herein on an eye.

Reference is now made to the figures, and in particular, to FIGS. 1 through 3b. In FIG. 1, a patient 15 is depicted as sitting on a chair with his head supported by a head rest 16. This arrangement requires the patient's head to turn so that he looks up, whereby the eye to be photographed sights into a camera guiding head 17. The line of sight of the eye looking into head 17 is depicted by line 18. As will be seen hereinafter, upon looking into guiding head 17, the patient's line of sight 18 becomes properly aligned for photographing. Camera guiding head 17 is supported by an arm support 19 fixed to a camera casing 20, whereby the horizontal distance 21 between the vertical sight line 18 and the camera lens 22 is fixed and determinable. A fixed focal length camera 23 is carried at the rear portion of casing 20 in accordance with an arrangement wherein camera 23 is clamped or otherwise held in fixed relationship to camera lens 22. A metal tube 24 of fixed length supports lens 22 at the front end of the assemblage. Tube 24 is also mounted to casing 20 in accordance with an arrangement whereby tube 24 and thus lens 22 are clamped or otherwise held in fixed relationship with respect to casing 20 and thus camera 23. FIGS. 2a through 2c illustrate the component parts constituting casing 20, the arm support 19 and tube sub-assemblies, which sub-assemblies are attached or otherwise mounted to casing 20. The illustrated sub-assemblies afford ease and economy of manufacture and assembly. When the two halves 20a, b of casing 20 are bolted together, a recess 25 is formed in the front portion of casing 20 for mounting and aligning the tube sub-assembly therein. Means, such as a clamp device 26, may be provided at the rear of casing 20 for clamping camera 23 against casing wall 27.

A camera viewer 28 is mounted on top of camera 23 to permit the fitter to sight the eye in order to align camera 23 for taking a picture of the patient's cornea 29. For properly adjusting the camera line of sight 21, casing 20 may be bolted to table 30, which table may be provided with conventional translating means 31, 32, 33 for adjusting the position of camera lens 22 with respect to the patient's eye, respectively, up and down vertically, forward and rearwardly parallel to camera line of sight 21 and/or laterally to the left or right with respect to such line of sight.

The foregoing arrangement of a fixed focal length camera 23 in combination with guiding head 17 defines an assemblage, whereby when the patient looks into head 17 and properly sights the light therein, the fitter is then certain that the patient's eye and, in particular, the horizontal meridian passing through the center of the cornea thereof is being properly sighted by camera 23. To achieve this result, guiding head 17 is supported a fixed distance from camera 23 and oriented to cause the eye sight line 18 to be perpendicular to the camera line of sight 21, when the light source in head 17 is being properly sighted. By reason of the foregoing arrangement, the fitter is assured that the picture of the eye will be in focus, and that the picture will show the desired cornea curvature across the full diameter of the cornea, i.e. the profile curve depicting the horizontal meridian through the cornea center. In addition, the fitter will be assured that the magnification factor of the picture will be fixed for all photographs taken by camera 23. The latter is obtainable because the distance of the eye from the camera is fixed, since line of sight 18 is a fixed distance from camera lens 22 and arm support 19 is fixed to casing 20.

Referring now to FIG. 4, the crystalline lens of the eye is indicated at 34 in front of which there is an iris 35, which defines the pupil 36. The cornea is generally indicated at 29 and the sclera at 37. The limbus portion of the eye which distinguishes in general the sclera from the cornea is indicated at 38. A corneal contact lens, illustrated at 39, generally consists of a curved body having a concave-convex through section and is made up of a suitable transparent or semi-transparent material. In practice, lens 39 has a preselected overall diametrical size, such that the lens 39 when applied to the anterior surface of the eye lies within the area defined by limbus 38.

Reference is now made to FIGS. 3 through 3b, which shows the internal details of guiding head 17. Head 17 includes a light source 40 supported near the top thereof. Wiring 41 for light 40 may be led from casing 20 through arm support 19 into guiding head 17. A pair of parallel spaced disc-shaped plates 42, 43 are supported in head 17 below light 40 with plate 43 at the lower end of the assembly. Plates 42, 43 are aligned so that their surfaces are perpendicular to the axis of guiding head 17, i.e., the axis of line of sight 18. Both plates 42, 43 are provided with aligned sight apertures 42a, 43a constituted by small central openings communicating with the inner ends of narrow radial slots mutually spaced 90° apart. The radial slots of apertures 42a, 43a are aligned in the vertical dimension, i.e., line of sight 18.

In preparation of taking the picture of the patient's cornea, the patient is asked to sight light source 40 with one eye, the one to be photographed, which he sights through apertures 42a, 43a. In sighting light 40, the patient is asked to line up the aligned radial slots of the two apertures 42a, 43a. In lining up the radial slots on the two plates, it was found difficult for a person to focus both sight apertures 42a, 43a simultaneously. Hence, a suitable strength lens 44 is supported between plates 42, 43, whereby when the patient focuses on the sight aperture 43a, the sight aperture 42a automatically comes into focus. When the patient lines up the pair of apertures 42a, 43a, in particular the radial slots thereof, the line of sight 18 of his eye automatically falls directly in line with the axis of guiding head 17, which as previously stated is disposed perpendicular to the camera line of sight 21. If at the same time the fitter sights cornea 29 of the patient through camera viewer 28, the cornea becomes automatically positioned in alignment with camera line of sight 21. The foregoing arrangement provides the desired picture, which as noted previously is a well-focused picture of uniform and fixed magnification and which provides the profile curve of the horizontal meridian through the center of the cornea across the full diameter of the cornea.

It will be convenient and thus preferable for the fitter to have the photograph of the eye developed within a short time after taking same, whereby a lens fitting may be completed without undue delay. Hence, it is preferable to employ a camera provided with a commercially available instantaneously and self-developing film process, such as the commercially well-known Polaroid apparatus. In addition, the Polaroid process can now provide a transparent positive film without further processing. Thus, within two minutes of taking a photograph, the fitter has a transparent positive film which he may install in an enlarger for the measurement of the cornea.

FIG. 5 depicts a picture of a typical cornea 29 taken by the camera system disclosed herein. Curve 45 depicts the horizontal meridian profile across the full diameter of cornea 29, which meridian extends through the center of the cornea. In accordance with the practice of the invention, it is this meridian that exhibits the flattest curvature of all the meridians extending through the eye. Accordingly, it is this meridian in accordance with the practice of the invention herein which is to be used to determine the radius of curvature of the concave surface of the lens. The diametrical size of the lens and its curvature should be selected so that the lens is characterized by a posterior curvature that does not touch curve 45 at two points, which is to say, that the lens curvature will be one that is not steeper than the flattest portion of curve 45. This method of selecting lens curvature will assure the fitter that its posterior surface is not steeper than any other part of the cornea surface. Similarly, the lens curvature should not be flatter than curve 45. If a lens is flatter than the flattest part of the cornea, the cornea will experience a central point pressure when the lens is worn which will irritate cornea. In addition, if the lens is too flat it will have a tendency to rock when worn and, moreover, the peripheral edge of the lens will tend to stick out away from the eye which will cause lid irritation. In conclusion, it is in accordance with the practice of the invention herein to employ the complete curve of the flattest meridian passing through the cornea, i.e., the horizontal meridian, because it has been found that this meridian provides the necessary and sufficient information to determine the size and the posterior curvature of a corneal contact lens.

The picture taken of the eye is preferably enlarged and projected on a suitable screen or paper. Enlargement of the picture to a known size or magnification of the actual size of the eye is easily accomplished by taking a photograph of graph paper by camera 23. The graph paper for this purpose is supported in a flat plane accurately held perpendicular to line 21 and coplanar with line of sight 18 so that the graph paper picture is the same distance from lens 22 as will be all the other eye pictures to be taken by the camera assembly of FIG. 1, and by such arrangement the magnification of the graph paper picture will be the same as for the other eye pictures. The graph paper picture is then inserted in a projector provided with an adjustably fixed enlarger. The enlarger is adjusted so that the magnification of the projected graph paper picture is such that one division of the enlarged picture of the graph paper coincides with ten divisions of the original graph paper whereupon the projector enlarger is locked so that all other eye pictures will be similarly magnified. A 10 to 1 magnification is convenient because the size of the cornea and its radius of curvature to be measured is in the order of 10 mm., whereby it would be more convenient to make measurements in the order of centimeters. Under the foregoing arrangement, the projected picture of the graph paper and eye is magnified ten times the size of the original graph paper and thus the actual eye.

A curvature gauge 46 disclosed in FIG. 6 is used to determine the radius of curvature of the enlarged picture. It will be understood that any measurement made on an enlarged picture should be divided by the magnification factor to obtain the actual size of measurement. Gauge 46 comprises a conventional dial indicator 47 and, in addition, includes a pair of spaced and parallel aligned cross rods 48, 49. Rod 48 is fixed with respect to indicator 47 by being an integral extension of a central block 50, which block is attached to the indicator casing in any suitable manner. Block members 51, 52 are rigidly supported at the individual ends of rod 48. Blocks 51, 52 are adapted to serve as journal supports for turnable rod 49. The central and end blocks 50, 51, 52 are provided with aligned openings whereby the center and ends of rod 49 are suitably journalled for rotation in either direction about its axis. The portion of rod 49 extending through central block 50 has an annular groove 53 engaged by a smooth ended dog screw 54 whereby rod 49 cannot move sideways to the left or right, but is free to rotate about its axis upon turning of knob 55 fixed to one end thereof.

The exposed left portion of rod 49 between central block 50 and end block 51 has a left hand screw thread. The exposed right portion of rod 49 between central block 50 and end block 52 has a right hand screw thread. A pinholder 56 is fastened to the front end of the indicator stem 57 to move therewith. A sharp ended and rigid pin-like pointer 58 extends integrally from holder 56. The bottom surface of pointer 58 is substantially flush with the bottom flat surface of its holder 56. A pair of pinholders 59, 60 are provided with spaced through openings to permit them to be mounted for travel axially along rods 48, 49 on respective sides of block 50. The openings of holders 59, 60 engaging threaded rod 49 are suitably threaded so that holders 59, 60 travel along rods 48, 49 simultaneously towards and away from each other depending upon the direction of rotation of rod 49. Sharp ended and rigid pin-like pointers 61, 62 extend integrally from respective holders 59, 60. The bottom surfaces of these pointers are substantially flush with the flat bottom surfaces of their respective holders and coplanar with bottom surface of the pinholder structure attached to indicator stem 57 so that gauge 46 is adapted to slide smoothly over a flat surface, such as the projected picture taken of the eye.

Indicator stem 57 is spring loaded by spring means 63, which means are internal elements of the standard indicator. The spring load is in a direction to pull stem 57 for rearward movement. Stem 57 passes through the indicator dial and projects out from a bushing 64 integral with the dial casing. A sleeve member 65 provided with a through bore is mounted over the rear projecting part of stem 57 and is fastened to bushing 64. A portion of the sleeve bore is threaded at 66 to receive a turn screw 67, which screw bears against the end of the spring loaded stem 57. Upon advancing screw 67 into sleeve 65, stem 57 and thus the attached central pointer 58 moves forward against the spring load. When screw 67 is reversed, pointer 58 retracks under the spring load to follow screw 67.

Gauge 36 is adapted to measure the radius of curvature of curve 45. Since accuracy of measurement is of utmost importance, the screw threads along rod 49 and the threaded openings of holders 59, 60 are characterized whereby holders 59, 60 not only move simultaneously but also move uniformly and equally small distances toward and away from each other upon turning of rod 49. To assure a smooth approach of the three pointers over the flat surface of the projected picture depicted in FIG. 5, the bottom flat surface of the gauge casing is coplanar with the other sliding surfaces previously mentioned. As indicated in the figures, gauge 46 is initially arranged so that pointers 61, 62 are at all times each separated by an equal distance depicted as $d$ from center pointer 58. Gauge 46 is prepared for measurement by aligning the tips of the three pointers 58, 61, 62 with a straight line and setting indicator dial to zero.

In FIG. 7a, gauge 46 is depicted as measuring the radius of curvature of the central zone of the photographed curve 45. This information is used to determine the optical correction to be ground on the anterior surface of lens 39 for correcting the patient's vision. The FIG. 7a central reading should be substantially the same or slightly flatter than a K reading taken by the Karatometer. If the central zone reading is substantially different than the K reading, then the photograph should be scrutinized carefully to determine whether the eye is irregular in some respect. However, the picture should be taken over if it is of poor focus or if the eye lid interferes with the measurements to be made. In FIGS. 7b and 7c, gauge 46 is depicted as measuring the average radius of curvature of the photographed curve 45 on opposite sides of the apical region of cornea 29. The latter measurements will provide the flattest radius of curvature measurement, i.e., in the order of 1.0 to 2.0 mm. flatter than the curvature of profile curve 45 at its central zone.

In accordance with the practice of the invention, it has been determined that the curvature measurements on the opposite sides of the cornea provide the flattest of the average radii measurements and, therefore, it will be one of these readings for each eye that should determine the base curve radius of posterior curvature of lens 39 for the individual eye. Moreover, to obtain the proper reading for substantially all eyes, it was discovered that the separation of pointers 61, 62 for the purpose of lens curvature measurements are related to the diametrical size of the cornea and that the two pointers 61, 62 should be spaced apart a ratio of 9/18.5 of the measured diameter D of the cornea. For the purpose of definition, the diameter of cornea 29 is depicted as D in projected photograph, FIG. 5. Diameter D is measured from the photograph of the eye. Generally, the photograph of the human eye will show a slight break in curve 45 at the limbus regions 38a, b (FIG. 5) and the diameter D is the distance along a straight line laid out between such points. In most instances, the eye at its nasal end will indicate a break in curve 45. Not infrequently, curve 45 at the temporal end of the eye is relatively smooth and thus break at this end sometimes is not detectable. Should this be the case, the fitter can determine cornea diameter D by the fact that the photograph will show a transition from the iris and limbus of the cornea to its sclera portion by reason of change of color in the photograph. The junction where the change of color indicates the transition from the limbus to the sclera will determine the cornea periphery. The same technique may be used to ascertain first-mentioned peripheral point, should the break at the nasal end also be imperceptible. Should the color transition of limbus to sclera at the points 38a or 38b in the photograph lack sharp definition, the diameter D may be determined by extrapolating the transition curve T from its center towards its ends to intersect with curve 45. Once points 38a, b are determined, line D is laid off and then bisected. Line C is laid off perpendicular thereto from the bisecting point along D. Hence, line C passes through the center of the cornea as determined by the projected photograph and this line need not necessarily bisect pupil 36. For example, it has been noted that some eyes will have its pupil slightly off-set from the laid off line C.

The average cornea diameter D for the human eye is in the order of 13 mm. Pointers 61, 62 are shown spaced 2d apart and are now set for the $$\frac{9}{18.5}D$$

spacing. Since the magnification factor is presumed to be 10, pointers 61, 62 are in the order of centimeters apart for measuring the magnified projected picture. For the reading shown in FIG. 7a, gauge 46 is applied to curve 45 by bringing the tips of pointers 61, 62 in contact with curve 45 and adjusting screw 67 so that center pointer 58 touches curve 45 where it is intersected by line C. This central zone reading generally will be a steeper reading than those to be taken hereinafter. Now gauge 46 is applied for the measurements of FIGS. 7b and 7c. In FIG. 7b, the measuring tips of pointers 61, 62 are brought up in contact with curve 45 with pointer 62 at the intersection of line C and curve 45. Screw 67 is adjusted so that tip of center pointer 58 also touches curve 45. Dial indicator will indicate the distance x. This is again repeated on the other side of line C as shown in FIG. 7c, with measuring tip 61 at the intersection of line C and curve 45. For a small number of persons, it has been discovered that for many reasons, such as early damage to the eye or some other physical irregularity, that a person's pupil will either be extremely irregular in shape or off-set far from line C as shown in FIG. 5a. If this is the situation, the foregoing three readings are repeated again but using line C—C of FIG. 5a as the center line. Line C—C is a line normal to line D, but passes through the center of the off-set or irregularly shaped pupil. Hence, line C—C does not bisect line D.

The distance x is the amount of projection along the axis of indicator stem 57 that the measuring tip of pointer 58 projects from the chord defined by the measuring tips of the end pointers 61, 62, which chord is perpendicular to the stem axis and spans the measured portion of profile curve 45. With the distance d between any two adjacent pointers known, the radius of curvature of the measured portion of curve 45 is determined by the following equation:

$$r = \frac{d^2}{2x} + \frac{x}{2} \quad [1]$$

For the convenience of the fitter, a scale may be printed along rod 48 to permit one to read off the distances d. The value of r may be computed for each measurement using Equation 1 or may be determined from a chart comprising a tabulated family of curves, whereby a value of r may be ascertained for any value of d or x.

Since each eye of every person is not identical to the other, it will be understood that the fitter should take individual photographs of each eye wherein the lens for the individual eyes will be selected in accordance with the measurements taken from their respective photographs. In accordance with the practice of the instant invention, lens curvature is selected to be equal to r as determined from the largest reading of the foregoing measurements which will be either a FIG. 7b or FIG. 7c reading.

Upon employing a lens curvature of r and of suitable diametrical size, it has been found that the pushing force against the cornea is distributed uniformly over a large area of the lens surface in contrast to a concentrated pushing force at a single point, discrete points or lines on the cornea. In addition, it has also been found that the diameter of lens 39 can be properly determined by the measurement D. Except for a very small percentage of persons, the diameter of lens 39, depicted as "diam.," in FIG. 10a, should be approximately $11/14$ of the D measurement. Some instances are encountered wherein a patient's lower eyelid normally extends very much below the cornea and on the other hand, others will have a lower eyelid that normally extends across the cornea. In these instances, the diameter of the lens is enlarged or made smaller, respectively, in a proportionate amount in order to improve lens wearing comfort.

For a small percentage of persons, it is found that their upper eyelid is relatively taut or tense, in which case the radius of curvature of the lens should be increased approximately $10/100$ to $15/100$ mm. greater than the measured value of r so that the periphery of the lens generally avoids continuous touch or contact at the limbus region. The eye is most sensitive to touch or contact at the limbus and at the central portion of the cornea in contrast to the relatively less sensitive sclera region. Consequently, further flattening of the lens will shift normal touch or contact of the lens peripheral edge from the limbus region to the sclera.

In other rare instances, persons were found with substantially spherical corneas. In this situation, the cornea is depicted in FIG. 11 and indicates a slight flattening near the limbus. For example, across a chord "e" measuring 6 mm., to a chord "g" measuring 8 mm., r measured 7.75 mm. The r measurements increased gradually thereafter to 7.80 and 7.90 mm. across chord "h" and "i," which chords are respectively, 9 and 10 mm. The lens for the eye is preferably a value between 7.80 and 7.90 mm.

In preferred embodiment, lens 39 is a segment of a sphere whereby its posterior surface is constituted by a single radius of curvature. Although the foregoing improvements can be used to fit a lens which has a central spherical portion and perhaps a flatter peripheral portion, the invention illustrated herein and in its preferred embodiment is the single radius spherical lens. The movement of the preferred lens does not disturb the vision, which is the prime object of the lens. So called bi-curve or tri-curve lenses hinders vision when it shifts on the eye. Another advantage of a lens fitted in accordance with the foregoing methods, is that such a lens is characterized by freer movement over the eye in comparison to the prior art lens fitted on K.

FIG. 10a depicts lens 39 in accordance with the invention. The large dark area 68 is the portion of the lens over which the pushing force is uniformly distributed. The phenomenon can be observed by putting a harmless dye in the eye before applying the lens thereto and observing the eye under an ultraviolet light. The large dark area 68 need not appear at the center of the lens. Its position will change and will depend upon the position of lens 39 as it moves about on the eye. In contrast to the manner in which lens 39 wears on the eye as depicted in FIG. 10a, FIG. 10b illustrates a lens fitted in accordance with the prior art, i.e., a lens fitted on K or slightly flatter than K.

The pattern of the lens in FIG. 10b will show a large horizontal pressure contact area 69 and a pair of concentrated pressure contact lines 70 at the opposite peripheral edges of the lens. This pattern indicates a relatively light touch or contact of the lens on the cornea over area 69 from the sensitive central zone of the cornea radially outwardly towards the limbus. The pattern is also accompanied by a pair of concentrated heavy pressure contacts or touches along lines 70 on the sensitive limbus region of the eye. A lens of this type normally can be worn with tolerable comfort for one to more hours of a day, depending upon the individual persons. However, if the wearer desires to wear the lens for the full waking hours of the day, some relief is required, preferably by periodic removal of the lens during the day because as the lens is worn, it gradually develops irritating stains on the cornea. These stains occur in the regions of the eye between the apex of the cornea and the limbus, in particular, in the regions of the concentrated forces lines 70. The effect of the stains are cumulative because as they develop in intensity, the irritation increases to induce automatic blinking of the eye which increases the intensity of the stains. Removal of the lens periodically from the eye is the most effective relief. Oftentimes, eye blinking induced by the stains causes the lens to pop out of the eye, which is annoying, particular if the lens is lost. Some attempts have been made to overcome the foregoing problems by fitting the lens slightly flatter than K or bevelling the peripheral edges of the lens to release the touch along lines 70 from the limbus area of the eye. Unfortunately, this practice merely results in moving the concentrated lines 70 towards the central zone of the lens, but does not basically correct the problem.

A further disadvantage of this type of lens is that it does not permit free and easy movement over the eye in comparison to the ease of movement of a lens with respect to the eye for a lens in accordance with the instant invention. Accordingly, a lens fitted in accordance with the prior art K reading or slightly flatter than K, prohibits relatively free natural fluid feeding of the eye during wearing of the lens. Ultimately, a lens fitted on K or slightly flatter than K can be tolerated under the foregoing conditions for one or more years by the wearer, depending upon the individual person. However, experience has shown that each individual person will arrive at a stage wherein he can no longer tolerate the lens even by increasing periodic removal of the lens during each day for relief. When this point in ones use of the lens is reached, the contact lens is generally discarded for the more familiar spectacle.

In the relatively very few instances where a person has a substantially spherical eye as noted hereinbefore, a lens of the type shown in FIG. 10b may be used with satisfactory results. However, the percentage of people in this category are extremely small.

A lens with a pattern characterized by that shown in FIG. 10c is the result of fitting a lens with a curvature approximately .4 to about .8 mm. flatter than K. This lens is characterized by a heavy concentrated linear pressure touch 71 near a peripheral edge of the lens and thus in the limbus region of the eye and a substantially diametrically opposite distributed area pressure touch 72. The concentrated touch along line 71 is generally so extreme and severe that when such a lens is worn, even as little as 15 minutes, sufficient discomfort results which automatically induces the eye to blink repeatedly to relieve pain. Unfortunately, this causes a sharp stain to develop at 73 in the region of 72. The foregoing is cumulative because as stain 73 develops, it contributes to the pain which induces more blinking and thus a heavier stain at 73. On a whole, a lens of this type cannot be worn for more than 20 or 30 minutes without the discomfort or pain becoming so intolerable to require removal of the lens. Inasmuch as the lens characterized by FIG. 10c is substantially flatter than K, and since it produces an intolerable lens, the optical art consequently subscribed to the basic principle that the lens curvature should be based upon the K reading or made slightly flatter than the K reading, but must not exceed the K reading by about .4 mm. to about .8 mm., depending upon the individual person, otherwise severe lens problems result. Essentially, the effect of the FIG. 10c lens was to create a barrier in the technique of fitting beyond which persons in the art heretofore did not explore. In contrast to the previous practice, a lens in accordance with the present invention is fitted pursuant to measurements as indicated hereinbefore, regardless of the fact that the resulting curvature applied to the lens will be anywhere from 1 mm. to 2 mm. flatter than K and thus is contrary to a basic theory of the current state of the art. The lens in accordance with the invention will eliminate the foregoing described problems of the prior art. The preferred lens has a further advantage that it has a tendency to move freely about the eye during eye movement and blinking whereby the peripheral edge of the lens oftentimes overlaps the limbus points 38a, 38b so that the lens edge touches or creates an edge contact on the sclera as depicted in FIG. 12. This is confirmed by a ring type stain on the sclera after wearing a lens in accordance with the invention. However, the sclera is not sensitive as is the cornea or limbus regions of the eye and, therefore, lens 39 may be worn on the eye for the full waking hours of a day.

A further advantage of the invention is that it readily provides a suitable lens diameter for substantially most persons. A proper lens diameter has the additional feature of minimizing stick-out. If the diameter of the lens is too large, a portion of its peripheral edge will stick out away from the cornea even though its large area 68 uniformly sustains its pushing force against the cornea. Stick out of the lens does not serve any useful function. For example, it does not contribute to cirulation or feeding the eye with lacrimal fluids since such circulation and feeding is accomplished solely by free and often movement of the lens over the eye as a result of normal eye movement and blinking. When the lens is stationary on the eye, there is negligible if any fluid feeding to the cornea even if the periphery edge of the lens sticks out from the cornea. As a matter of fact, stick-out should be minimized because it creates lid irritation.

The foregoing method of determining curvature radius $r$, involves measuring curve 45 by spanning a cord thereof equal to $9/18.5$ of its diameter D, which chord extends from the intersection of line C with curve 45 to a point on the curve adjacent the peripheral edge of the cornea. This method provides the preferred radius $r$. However, a radius $r$ may also be determined by measurements from the peripheral edges of the cornea. It has been found that when pointers 61, 62 are set apart about one-half D and the measurements are taken from points 38a and 38b, that is to say, in one measurement pointer 61 is placed on point 38a of curve 45 with pointer 62 on curve 45 adjacent line C to determine $x$ and then repeating same for the other side of the cornea, that the flattest measurement of $r$ so obtained generally provides a satisfactory lens radius for most persons. However, when employing this latter method of measurement it has been found that sometimes some small adjustment is required to obtain the optimum lens curvature to assure a satisfactory fit. It will be understood that the previously described method, wherein the chord is measured from the intersection of the bisecting line C and curve 45, is the preferred method because the measurement determined in this manner very seldom, if ever, requires corrective adjustments and this applies to almost all persons except for the very small percentage of situations, as noted hereinbefore, wherein corrective adjustments are made to accommodate a tense eyelid.

It is intended that all matter contained in the above description or shown in the accompanying drawings shall be interpreted as illustrative and not in a limiting sense.

What is claimed is:

1. Apparatus for fitting a corneal contact lens to a human eye by means of photographing the eye comprising, a fixed focal length camera located with respect to the human eye to take a profile picture of a horizontal meridian passing through such eye, a sight object located a fixed distance in front of said camera, said sight object also being located with respect to the person whose eye is being photographed so that the line of sight of the eye being photographed when sighting said sight object is perpendicular to the camera line of sight and also a fixed distance from said camera, whereby the picture taken of the eye illustrates a horizontal meridian extending through the center of the cornea and is also characterized by a known magnification factor of the actual size of the photographed eye, and wherein said sight object comprises, a pair of spaced sight members having aligned sight apertures, said sight apertures when being sighted by the eye defining said eye line of sight a fixed distance from said camera and perpendicular to the camera line of sight.

2. Apparatus as defined in claim 1, wherein said sight apertures are defined by mutually aligned and narrow radial slots, the slots of each sight member having their inner ends communicating with a central opening, and means supported between said sight members wherein the sight aperture furtherest from the eye is automatically in focus when the sight aperture nearest to the eye is being sighted and is in focus.

3. Apparatus for fitting a corneal contact lens to a human eye by means of photographing the eye comprising, a fixed focal length camera located with respect to the human eye to take a profile picture of a horizontal meridian passing through said eye for the full diameter of its cornea, and a sight object located a fixed distance in front of said camera and with respect to the person whose eye is being photographed, said sight object including a light source, and a pair of spaced sight members having sight apertures mutually aligned with respect to said light source, said apertures being located between the eye to be photographed and the light source so that when said light source is sighted through said apertures then the line of sight of said eye is a fixed distance from said camera and perpendicular to the camera line of sight, and wherein the picture taken of the eye illustrates a horizontal meridian extending through the center of the cornea and which picture is characterized by a known magnification factor of the actual size of the photographed eye.

4. Apparatus as defined in claim 3, wherein said sight apertures being defined by mutually aligned and narrow radial slots, the slots of each sight member having their inner ends communicating with a substantially circular opening, and a lens supported between said sight members whereby the sight aperture furthest from the eye is automatically in focus with the sight aperture nearest the eye is being sighted and is in focus.

References Cited in the file of this patent

UNITED STATES PATENTS

| | | |
|---|---|---|
| 1,151,635 | Webb | Aug. 31, 1915 |
| 2,279,795 | Nissel | Apr. 14, 1942 |
| 2,478,545 | Pearce | Aug. 9, 1949 |
| 2,510,438 | Tuohy | June 6, 1950 |
| 2,586,973 | McMillin | Feb. 26, 1952 |